United States Patent
Wilenski et al.

(10) Patent No.: US 10,493,720 B2
(45) Date of Patent: Dec. 3, 2019

(54) KINETIC ENERGY ABSORPTIVE COMPOSITE ARTICLE AND ABSORPTION METHOD

(71) Applicant: The Boeing Company, Chicago, IL (US)

(72) Inventors: Mark S. Wilenski, Mercer Island, WA (US); Michael P. Kozar, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/904,955

(22) Filed: Feb. 26, 2018

(65) Prior Publication Data

US 2019/0263088 A1    Aug. 29, 2019

(51) Int. Cl.
| | | |
|---|---|---|
| *C08J 5/04* | (2006.01) | |
| *B32B 5/12* | (2006.01) | |
| *B32B 5/26* | (2006.01) | |
| *B64D 37/02* | (2006.01) | |

(52) U.S. Cl.
CPC ............ *B32B 5/12* (2013.01); *B32B 5/26* (2013.01); *B32B 2307/56* (2013.01); *B32B 2605/18* (2013.01); *B64D 37/02* (2013.01)

(58) Field of Classification Search
CPC ....................................... B32B 5/12
USPC ....................................... 428/114
See application file for complete search history.

(56) References Cited

U.S. PATENT DOCUMENTS

| | | | |
|---|---|---|---|
| 4,868,038 A | 9/1989 | McCullough, Jr. et al. | |
| 4,871,598 A | 10/1989 | Potente et al. | |
| 5,523,141 A | 6/1996 | Fyler | |
| 6,048,426 A | 4/2000 | Pratt | |
| 2004/0048022 A1 | 3/2004 | Pratt | |
| 2016/0347918 A1* | 12/2016 | Le | C08J 5/042 |
| 2017/0144818 A1 | 5/2017 | Wilenski et al. | |

FOREIGN PATENT DOCUMENTS

WO    WO2007109100 A2    9/2007

OTHER PUBLICATIONS

European Patent Office; Extended European Search Report; European Patent Application No. 18210686.4; dated Jul. 17, 2019.

\* cited by examiner

*Primary Examiner* — Brent T O'Hern
(74) *Attorney, Agent, or Firm* — Parsons Behle & Latimer

(57) ABSTRACT

A kinetic energy absorptive composite article includes a first ply and a plurality of inherently straight first fibers contained in the first ply. First length portions of the first fibers are arranged with first localized ripples that deviate from and return to individual first routes of respective first length portions. The article includes a second ply parallel to the first ply, a plurality of inherently straight second fibers contained in the first ply or the second ply, and a matrix material at least partially encapsulating the first and second plies. Second length portions of the second fibers are arranged without localized ripples or with second localized ripples that deviate from individual second routes of respective second length portions to a lesser extent than the first localized ripples and return to the individual second routes. The second routes are substantially parallel to the first routes.

20 Claims, 7 Drawing Sheets

KINETIC ENERGY ABSORPTIVE COMPOSITE ARTICLE AND ABSORPTION METHOD

BACKGROUND

Aircraft, spacecraft, and other structures may be impacted by various foreign objects. Examples include debris (such as tire treads, rocks, etc.), hail, micrometeoroids, etc. Breach of the structure could significantly damage internal components and effect structural integrity, even resulting in catastrophic loss of aircraft, spacecraft and other vehicular structures.

Aircraft, spacecraft, and other vehicular structures that carry fuel may experience a breach of fuel containment during a ground impact. A variety of self-sealing fuel bladders and impact containment structures exist with the goal of resisting breach of fuel containment during such events. Known fuel bladders and containment structures designed with such goals in mind are often made of either fabrics or unidirectional fibers. However, a desire exists to reduce the mass of fuel bladders and containment structures while still providing the same breach resistance or increasing breach resistance.

Accordingly, it will be appreciated that more efficient materials to reduce breach of structures would be beneficial for aircraft, spacecraft, and other vehicular structures subject to impact by foreign objects. More efficient materials exhibit a higher specific strength (strength/density), sometimes referred to as the strength-to-weight ratio. Similarly, more efficient breach resistant fuel bladders and containment structures would be beneficial. Materials with higher efficiency maintain or increase resistance to breach with less mass of the structural material compared to known structural materials.

SUMMARY

A kinetic energy absorptive composite article includes a first ply and a plurality of inherently straight first fibers contained in the first ply. Individual first fibers have a cross-sectional shape that is substantially constant along a first length portion of the individual first fibers. The first length portions are aligned along substantially parallel first routes within the first ply. The first length portions are also arranged with first localized ripples in the first length portions that deviate from and return to individual first routes of respective first length portions. The article includes a second ply parallel to the first ply, a plurality of inherently straight second fibers contained in the first ply or the second ply, and a matrix material at least partially encapsulating the first and second plies. Individual second fibers have a cross-sectional shape that is substantially constant along a second length portion of the individual second fibers. The second length portions are aligned along substantially parallel second routes within the respective first ply or second ply. The second length portions are arranged without localized ripples in the second length portions or with second localized ripples in the second length portions that deviate from individual second routes of respective second length portions to a lesser extent than the first localized ripples and return to the individual second routes. The second routes are substantially parallel to the first routes.

A kinetic energy absorptive composite article includes a first ply and a plurality of inherently straight first fibers contained in the first ply. Individual first fibers have a cross-sectional shape that is substantially constant along a first length portion of the individual first fibers. The first length portions of the first fibers are aligned along substantially parallel first routes within the first ply. The first length portions are also arranged with a first pattern referenced to individual first routes of respective first length portions. The article includes a second ply parallel to the first ply, a plurality of inherently straight second fibers contained in the first ply or the second ply, and a matrix material at least partially encapsulating the first and second plies. Individual second fibers have a cross-sectional shape that is substantially constant along a second length portion of the individual second fibers. The second length portions are aligned along substantially parallel second routes within the respective first ply or second ply. The second length portions are arranged with a second pattern referenced to individual second routes of respective second length portions in a manner different from the first pattern. The second routes are substantially parallel to the first routes. The article further includes a means for progressively loading the first and second fibers when the composite article receives a sufficient force from kinetic energy.

A kinetic energy absorption method provides a composite article including a first ply, a plurality of inherently straight first fibers contained in the first ply, a second ply parallel to the first ply, a plurality of inherently straight second fibers contained in the first ply or the second ply, and a matrix material at least partially encapsulating the first and second plies. Individual first fibers have a first length portion providing a plurality of first length portions aligned along substantially parallel first routes within the first ply. The plurality of first length portions are arranged with first localized ripples in the first length portions that deviate from and return to individual first routes of respective first length portions.

Individual second fibers have a second length portion providing a plurality of second length portions aligned along substantially parallel second routes within the respective first ply or second ply. The plurality of second length portions are arranged without localized ripples in the second length portions or with second localized ripples in the second length portions that deviate from individual second routes of respective second length portions to a lesser extent than the first localized ripples and return to the individual second routes. The second routes are substantially parallel to the first routes.

The method includes progressively loading the first fibers and the second fibers when the first and second plies receive a sufficient force from kinetic energy by:

irreversibly shearing the matrix material or breaking adhesion of the matrix material to at least a part of individual second fibers accompanied by plastically deforming or causing failure of the second fibers; and irreversibly shearing the matrix material or breaking adhesion of the matrix material to at least part of the first localized ripples accompanied by pulling out at least part of the first localized ripples without failure of the first fibers.

The features, functions, and advantages that have been described can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
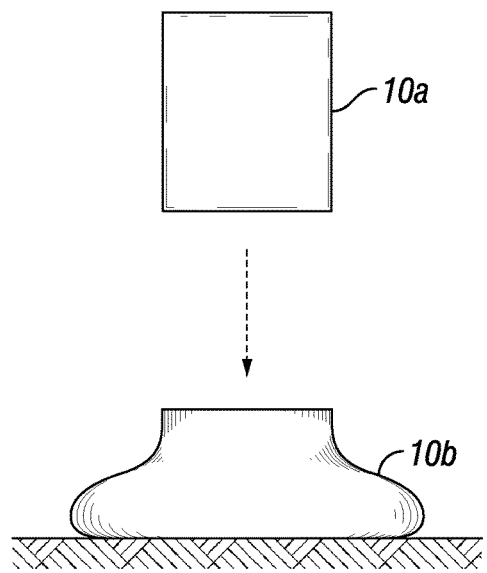
FIG. 1 shows a side view of a fuel bladder and its impact with the ground.

During a ground impact event, liquid fuel in a fuel bladder produces a hydrodynamic ram that may cause fibers to undergo very sharp impulse loading, potentially causing failure of the bladder wall. Known bladders have been very robustly designed to overcome a failure, but robustly designed bladder walls are heavy. FIG. 1 shows a fuel bladder 10a falling to the ground and being distorted upon impact to yield an impacted fuel bladder 10b. Distortion of the walls in impacted fuel bladder 10b shows one example of the impulse loading that fibers undergo from the hydrodynamic ram caused by contained fuel. Impact containment structures surrounding fuel bladders may be provided and similarly designed very robustly to meet performance criteria for an impact. A robust design might include very tough materials, such as KEVLAR or other synthetic fibers, and also may be heavy in keeping with the robust design.

The methods and apparatuses described herein allow progressive fiber loading and selective fiber failure as a mechanism for absorbing the kinetic energy applied by an impulse due to a ground impact. As such, the peak load on individual fibers may be reduced, allowing structure walls to be more efficiently designed and resulting in a lighter structure while maintaining performance. The same concept permits design of structures subject to impact by foreign objects, such that kinetic energy of objects may be absorbed and the peak load on individual fibers reduced.

Ripples in the fibers constitutes one design feature to assist with such objectives. Other assistive design features are described herein. By making at least some of the fibers non-straight, curves in the fiber within a ply can pull out during an impact event, permitting the fiber to change position prior to reaching its failure strain. As a result, targeted delamination of a composite and selective shearing of some fibers allows kinetic energy absorption without breach.

Figure 2:
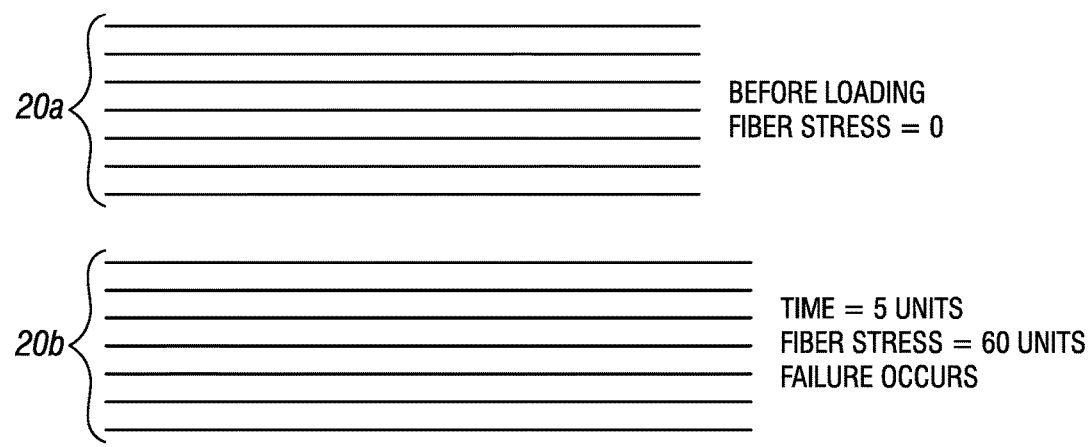
FIG. 2 shows a diagram of fibers in a ply before and after applying fiber stress.
Figure 4:
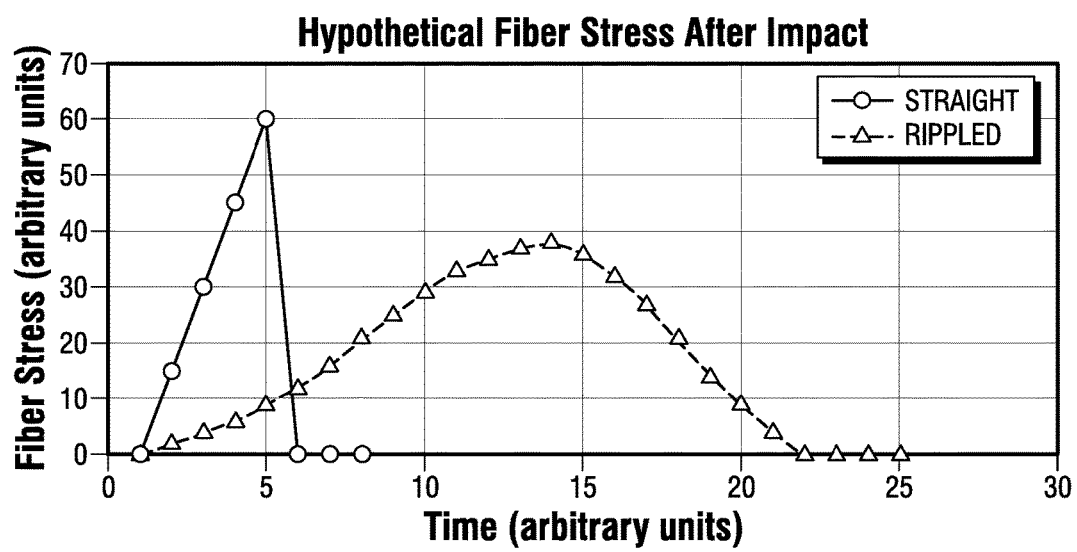
FIG. 4 is a chart of hypothetical fiber stress after impact for the fibers in FIGS. 2 and 3.

FIG. 2 shows fibers 20a before loading from a kinetic impulse when no fiber stress is applied and corresponds to the initial state in FIG. 4 for straight fibers. FIG. 2 also shows loaded fibers 20b after 5 arbitrary units of time when fiber stress reaches 60 arbitrary units of stress and failure occurs. FIG. 4 shows the hypothetical rise in fiber stress over 5 time units followed by failure.

Figure 3:
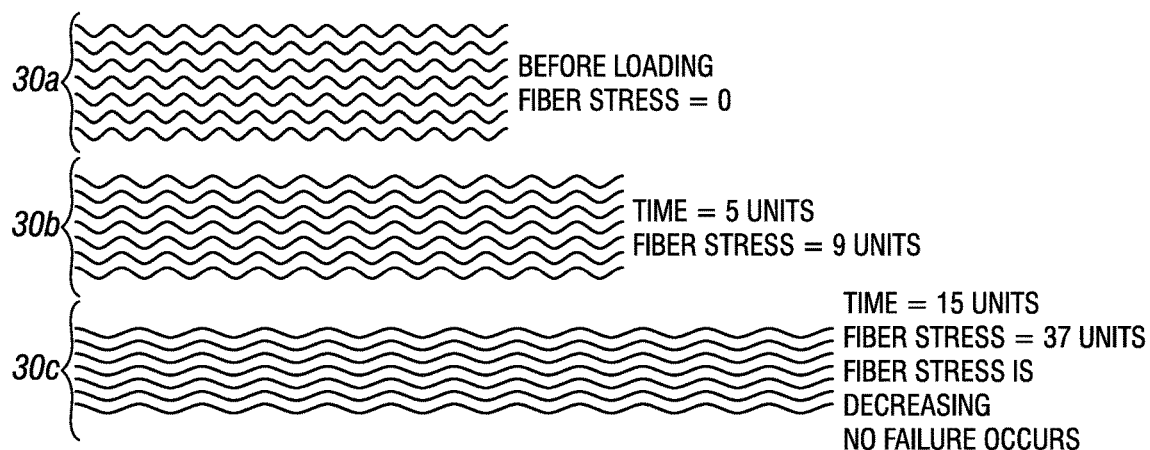
FIG. 3 shows a diagram of rippled fibers in a ply before and after applying fiber stress.

In comparison, FIG. 3 shows fibers identical to fibers 20a arranged as rippled fibers 30a before loading when no fiber stress is applied and corresponds to the initial state in FIG. 4 for rippled fibers. After 5 time units, loaded rippled fibers 30b are shown with some of the ripples pulled out. That is, the ripples are leveled somewhat or smoothed, with decreased amplitude and/or increased period. "Amplitude" refers to the height change in units of distance between a peak and an adjacent trough in the ripples, analogous to peak-to-peak amplitude for electrical oscillations. "Period" refers to the spatial distance over which a single cycle of the ripples extends in units of distance per cycle, analogous to the period for electrical oscillations. Although about 9 stress units exist in loaded rippled fibers 30b after 5 time units, the fiber stress is much less in comparison to the fiber stress after 5 time units for loaded fibers 20b in FIG. 2. Loading continues to increase and, after 15 time units, further loaded rippled fibers 30c show the ripples further pulled out, amplitude further decreased, and period further increased with more leveling or smoothing of the ripples. In FIG. 4, fiber stress is decreasing at 15 time units with peak stress reached at about 14 time units, but being insufficient to fail the fibers.

The loading of fibers in FIGS. 2 and 3 may be realized when a fuel bladder containing liquid impacts the ground, as in FIG. 1. The liquid pushes against the sidewalls of the bladder, causing outward pressure at the bottom of the bladder. In a relatively stiff bladder, the outward pressure at the bottom of the bladder rises rapidly and can cause failure of the bladder due to the high mechanical load. To mitigate failure in such circumstance, the kinetic energy of the outward pressure could be absorbed within the bladder walls during deformation using rippled fibers, such as in FIG. 3. The outward pressure pulls out the ripples in rippled fibers 30a which absorb the kinetic energy in the process. This is not to say that the fibers necessarily retract elastically after loading. Indeed, a fuel bladder containing rippled fibers 30a may plastically deform during a ground impact event, but nonetheless reduce fiber failure, containing the fuel.

Figure 5:
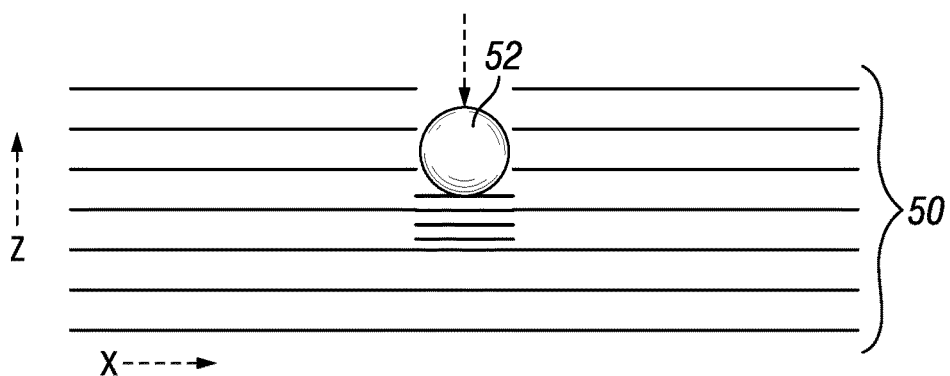
FIG. 5 is a side view of an object impacting a series of plies.

Similar principles apply in mitigating consequences of an object impacting a structure. FIG. 5 shows fibers 50 arranged in a series of plies where the x direction represents a lateral dimension along the fiber lengths and the z direction represents the vertical dimension through the thickness of the combined plies. FIG. 5 shows a side view of one fiber in each ply. Object 52 impacts fibers 50 in the through-thickness direction, or vertical dimension. FIG. 5 shows that many of fibers 50 failed during the impact of object 52 and were sheared ahead of object 52 as it traveled into the thickness.

The shearing of fibers 50 absorbs some of the kinetic energy of object 52 and helps to avoid breach of a structure by object 52. Even so, avoiding breach requires a greater mass of fibers and matrix compared to the methods and apparatuses described herein. Known damage resistant structures are made using mostly composites with a single type of fiber in a simple cross-plied layup. These layups might stop an object through mechanisms similar to those described herein, but the extent and location of the different mechanisms is not controlled. The methods and apparatuses herein provide a way of causing delaminations and shear failures at specific locations as well as influencing the shape of deformations as a damage resistant structure slows an impacting object. By causing deformations and shear failures to occur at desired locations and in desired modes, the structure may be more efficient and, thus, lighter in comparison to known structures without such features.

Figure 6:
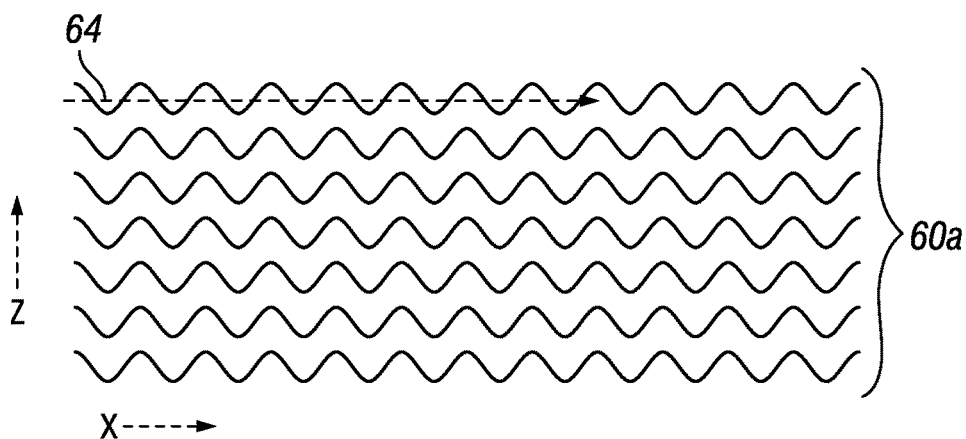
FIG. 6 is a side view of a series of plies containing rippled fibers.

FIG. 6 shows rippled fibers 60a arranged in a series of plies. Again, the x direction represents the lateral dimension along the lengths of fibers 60a and the z direction represents the vertical dimension through the thickness of the combined plies. Fibers 60a are aligned along substantially parallel routes with the location of one such route being identified by arrow 64. The existence of parallel routes for fibers 60a is consistent with stacking plies to form the combined plies. Cross plies orthogonal to rippled fibers 60a may be used in the methods and apparatuses herein, but are not shown for simplicity. Also, methods and apparatuses herein may include plies at other angles, such as 10°, 30°, 45°, 60°, etc., but are also not shown for simplicity. For example, one or more plies of 10° fibers may be included. In another method or apparatus, one or more plies of 30° fibers may be included. In yet another method or apparatus, one or more plies of 60° fibers may be included. Fibers 60a deviate from and return to individual routes, creating the rippled form shown. The routes extend in the same direction in each ply, designating substantially parallel routes for the fibers. It will be appreciated from the discussion herein that a substantially parallel route might deviate in a de minimis amount from a perfectly parallel route while still providing the benefits of the methods and apparatuses described herein.

Figure 7:
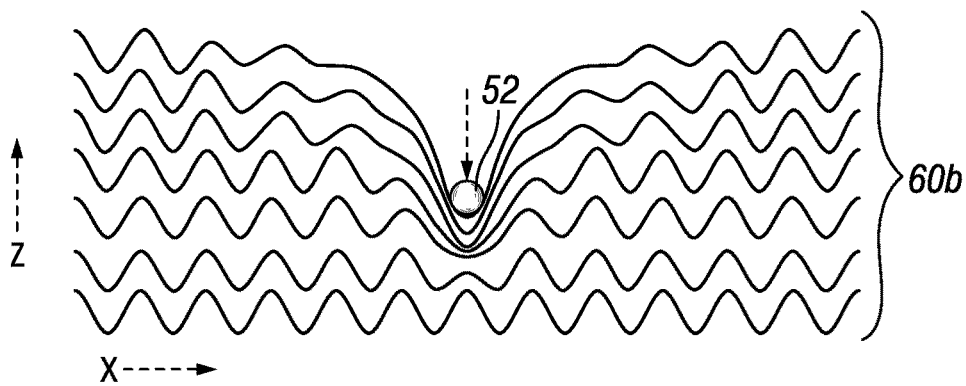
FIG. 7 is a side view of an object impacting a series of plies with rippled fibers.

FIG. 3 shows how ripples may pull out of a rippled fiber when outward pressure is applied (see FIG. 1) at the bottom of a fuel bladder during an impact with the ground. FIG. 7 shows a more focused impact, such as when object 52 impacts fibers 60a. Loaded rippled fibers 60b absorb the kinetic energy of object 52 instead of shearing as in FIG. 5. When object 52 impacts the first of rippled fibers 60a, the ripples of the fiber begin to pull out as object 52 progresses into the thickness and contacts the second, third, and successive fibers, progressively pulling out the ripples of each rippled fiber.

In the hypothetical of FIG. 7, object 52 impacts the fibers of five plies without shearing any of rippled fibers 60a. The ripples allow fibers 60b to dislocate from their original position as they progressively load without failing. The impact event in FIG. 7 involves more fiber simultaneously, compared to sequentially, as in FIG. 5. Thus, fibers 60b absorb more energy compared to fibers 50. Fibers 50 cannot dislocate from their original position and, consequently, load rapidly and fail rapidly and locally as object 52 impacts successive fibers.

Rippled fibers 60a (as well as rippled fibers 30a in FIG. 3) are shown with a sinusoidal path, meaning the path that the ripples follow as they deviate from and return to individual routes of the fibers. However, other options are possible for the ripples. For example, ripples need not be sinusoidal. Also, ripples need not deviate periodically, that is, at regular intervals, or in any consistent pattern. Ripples may deviate in some manner different from the sinusoidal path in FIGS. 3 and 6 while still permitting the ripples to pull out and to absorb kinetic energy during an impact event, whether impacted by an object or impacting with the ground. Among others, suitable examples additional to those shown in the Figures include a helix or a flattened helix.

On a related note, fibers 60a are shown deviating in the z direction, or vertical dimension representing the thickness of the combined plies. If the plies including fibers 60a are planar, then it will be appreciated that fibers 60a deviate out-of-plane for the plane defined by each ply. Even so, a similar effect of absorbing kinetic energy can be realized when fibers deviate in-plane for the plane defined by a particular ply. Various configurations for fiber deviation are described below.

FIG. 7 could be considered to show object 52 halted in its progression through the thickness of combined plies containing rippled fibers 60b. FIG. 7 may instead be considered to show object 52 at a point along its path continuing through the thickness. It is conceivable that object 52 could impact each of fibers 60b and continue past the thickness boundary of the combined plies without causing failure of the structure. Such circumstance could arise when object 52 continues through the thickness and engages all seven plies shown in FIG. 7. Object 52 could continue to pull out the ripples of fibers 60b, eventually halting with all seven fibers intact, but the ripples pulled out to the extent that the position of object 52 extends past the seventh fiber.

The same circumstance could arise with any number of plies such that an object impacts the full thickness of the combined plies. In such an impact event, the back layers of a structure may ultimately deform along with the front layers, depending on the thickness of the combined plies, while the impact event continues by pulling out the ripples of all the layers at the same time. Thus, rippled fibers constitute one consideration in tailoring energy dissipation as a function of the distance an object travels through the plies after impact. This allows controlling the force vs. distance used to stop the object.

Ripples may be formed using a variety of methods and apparatuses. One example includes a crimping device, such as one with cogs, that crimps fibers as the cogs turn and a fiber or a ply is fed through the crimping device. Such ripples may be formed in-plane or out-of-plane. Also, a set of bars or clamping bars may be used to push alternating sections of a fiber in opposite directions in a ply. Each section could be one-half of a period for the ripples. Such ripples might be most effectively made in-plane.

In addition to ripples, several design considerations exist that may assist in controlling kinetic energy absorption, accommodating a variety of expected types of impact events. One such design consideration involves selecting fibers with different properties, such as failure strain, modulus, strength, etc. These properties may be temperature dependent and/or may vary with time during an impact event while a structure deforms. Largely, fiber composition determines failure strain and other mechanical properties, but fiber manufacturing methods may also play a role. Such properties are often well-defined for known fibers and the most appropriate known fibers to achieve specified design goals may be selected.

Conceivably, fibers of the same chemical composition could exhibit different mechanical properties. Consequently, any references herein to fibers of different composition could be generalized to reference fibers of different mechanical properties, such as failure strain, even if fiber composition is the same.

In the context of the present document, failure strain is the engineering (i.e., nominal) strain at which a material fails. Also, "adhesion" refers to a widely-known property describing the tendency of surfaces to cling to one another. Additionally, "ductility" refers to a widely-known property wherein a material plastically deforms before failing, as contrasted with brittle materials. In some systems, ductility may be quantified as the percent elongation at failure. Further, "strength" refers to the ability of a material to avoid failure while withstanding an applied stress. In some systems, strength may be quantified as the ultimate tensile strength, meaning the maximum engineering (i.e., nominal)

stress of the stress-strain curve. Still further, "modulus" (i.e., "elastic modulus") describes the ability of a material to resist elastic deformation. In some systems, modulus may be quantified as the slope of the stress-strain curve in the elastic region. Failure strain, adhesion, ductility, strength, and modulus may be measured by a variety of techniques known to those of ordinary skill.

FIGS. 8-15 show various configurations that each include two types of fibers. Solid lines, such as for first fiber 80, represent a first type of fiber while dashed lines, such as for second fiber 82, represent a second type of fiber. First fibers 80 have a material composition in common and second fibers 82 have a material composition in common that is different from the first fibers' material composition. Likewise, in FIGS. 9-15, solid lines indicate first fibers with a common first composition and dashed lines indicate second fibers with a common second composition. Examples of known fiber materials includes nylon, polyethylene, aramid (e.g. KEVLAR), POM (polyoxymethylene, e.g. DELRIN), PTFE (polytetrafluoroethylene, e.g. TEFLON); PEEK (polyetheretherketone), polyesters (such as, PET (polyethylene terephthalate) and others), PP (polypropylene), and PVA (polyvinyl alcohol). Others are known as well. Although FIGS. 8-15 show two types of fibers, it will be appreciated that more than two types of fibers could be used to achieve a benefit in keeping with the design considerations described herein.

Figure 8:
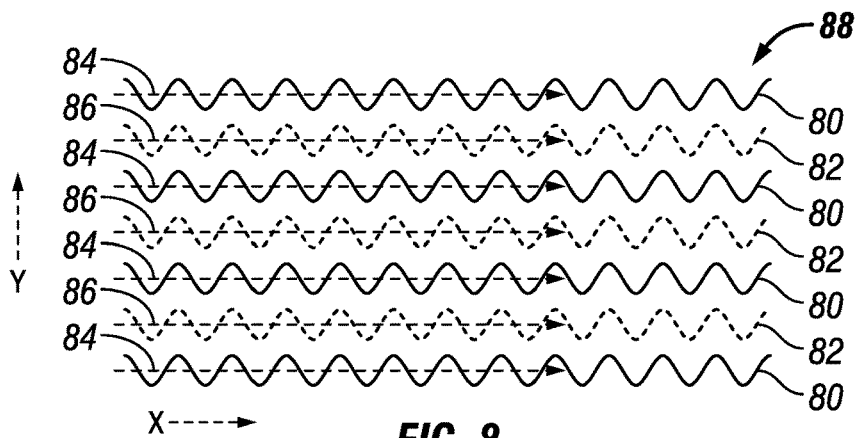
FIGS. 8-11 are top views of various single plies with rippled fibers.

FIG. 8 shows a top view of rippled first fibers 80 and rippled second fibers 82 with the x direction indicating a lateral dimension along the length of the fibers while the y direction indicates a lateral dimension across the width of the combined fibers in a ply 88. First fibers 80 are aligned along substantially parallel first routes 84 within ply 88. Ripples deviate from and return to individual first routes 84 of respective first fibers 80. Second fibers 82 are aligned along substantially parallel second routes 86 within ply 88. Ripples deviate from and return to individual second routes 86 of respective second fibers 82. First routes 84 are substantially parallel to second routes 86. Fibers 80 and 82 deviate to the same extent, for example, FIG. 8 shows that the amplitude and period of the sinusoidal path is the same for fibers 80 and 82. As mentioned, other types of periodic or non-periodic deviations may be used in the methods and apparatuses herein.

Figure 12:
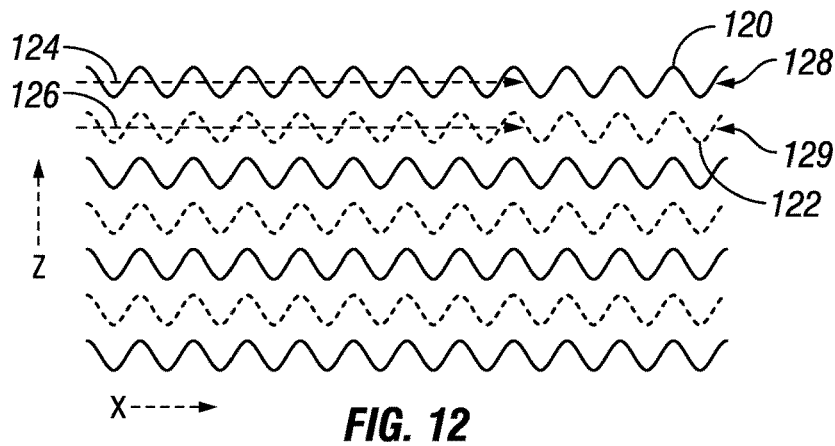
FIGS. 12-15 are side views of various series of plies containing rippled fibers.

FIG. 12 is similar to FIG. 8 in that first fibers 120 have a common first composition and second fibers 122 have a common second composition different from the first composition. Also, fiber 120 in first ply 128 is aligned along first route 124 in first ply 128. Fiber 122 in second ply 129 is aligned along second route 126 in second ply 129. Ripples in fibers 120 and 122 deviate from their respective routes to the same extent. While the x direction in FIG. 12 represents a lateral dimension along the fiber length, FIG. 12 differs from FIG. 8 in that the z direction represents a vertical dimension through the thickness of combined plies that include fibers 120 and 122. FIG. 12 shows seven of such plies. If ply 88 in FIG. 8 is planar, then ripples in fibers 80 and 82 would be considered to deviate in-plane. If plies 128 and 129 in FIG. 12 are planar, then ripples in fibers 120 and 122 would be considered to deviate out-of-plane.

Whether fibers are selected to deviate in- or out-of-plane mostly involves two considerations. First, it is expected that in-plane deviations will be more manufacturable, that is, less technically challenging to produce. Second, opportunity might exist for fiber interactions between plies with out-of-plane deviations. If ripples deviate out-of-plane from a ply, then ripples of adjacent plies potentially interact to increase energy absorption through increased friction or other forces between plies.

Another way to describe the orientation of ripples in FIGS. 8 and 12 involves a geometric surface defined by the fiber routes as a general case, regardless of whether plies are planar or curved. In FIG. 8, the ripples deviating from and returning to first routes 84 are coextensive with a geometric surface defined by first routes 84 within ply 88. In FIG. 8, ply 88 could be planar such that it may be said the ripples deviate in-plane. However, if ply 88 is not planar, it may still be said that the ripples are coextensive with a geometric surface defined by first routes 84 within ply 88. Similarly, the ripples in second fibers 82 deviating from and returning to second routes 86 are coextensive with the geometric surface defined by second routes 86 in ply 88.

Rippled second fibers 82 shown in FIG. 8 deviate in-plane with ply 88 and with first routes 84 of first fibers 80. That is, routes 84 and 86 are coplanar as well as parallel. In the event that ply 88 is not planar, the ripples of second fibers 82 would be coextensive with the geometric surface defined by first routes 84 for first fibers 80. In such a circumstance, it could be said that routes 86 also define the geometric surface of ply 88. Consequently, both first route 84 and second route 86 define the geometric surface. This concept may be further understood from the description below regarding FIG. 16.

Figure 9:
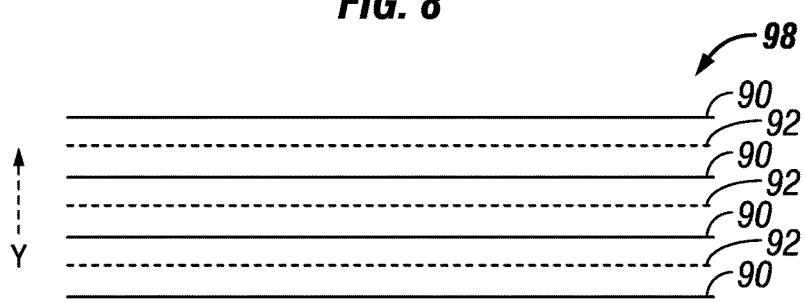

FIG. 9 shows a top view of rippled first fibers 90 and rippled second fibers 92 in a ply 98. The ripples of fibers 90 and 92 are not apparent from FIG. 9 since they deviate out-of-plane. The x direction in FIG. 9 corresponds to a lateral dimension along the fiber lengths and the y direction corresponds to a lateral dimension across the width of the combined fibers in ply 98. Rippled first fibers 90 have a common first composition and rippled second fibers 92 have a common second composition that is different from the first composition. That is, the fibers and ply in FIG. 9 are identical to the fibers and ply in FIG. 8 except for the out-of-plane deviation.

In effect, merely rotating ripples in fibers 80 and 82 of FIG. 8 to 90° around an axis corresponding to routes 84 and 86 turns the ripples to deviate out-of-plane, yielding the top view shown in FIG. 9. FIG. 9 does not show first or second routes of fibers 90 and 92 since they are superimposed over and could not be distinguished from the fibers themselves. Nonetheless, such routes exist and are identical in position to routes 84 and 86 in FIG. 8.

The concept of out-of-plane deviation applies when ply 98 is planar. The general case for both planar and curved plies would state that the ripples of fibers 90 and 92 deviate from and return to their respective routes and do not fully coextend with a geometric surface defined by the routes of fibers 90 within ply 98. In other words, the ripples extend outward from such a geometric surface. Ripples in FIG. 9 extend perpendicular to ply 98. However, the ripples could extend at different angles, such as 10°, 30°, 45°, 60°, etc., and still be considered not to fully coextend with the geometric surface defined by the routes of fibers 90.

Figure 10:
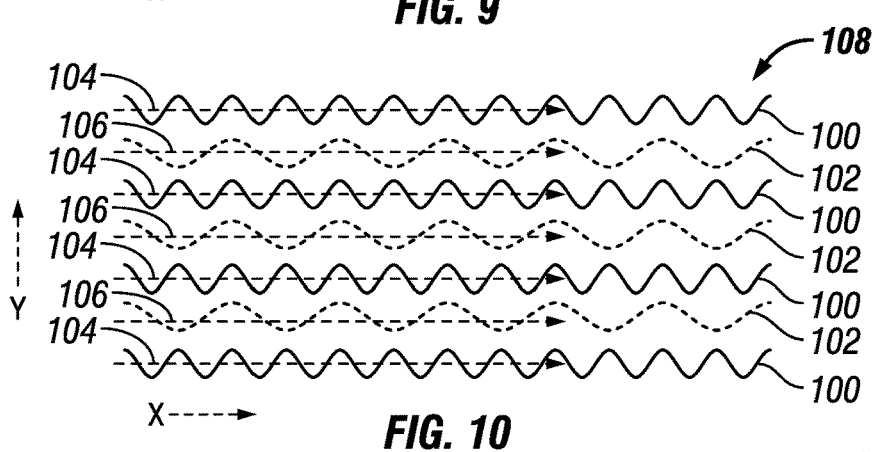
Figure 11:
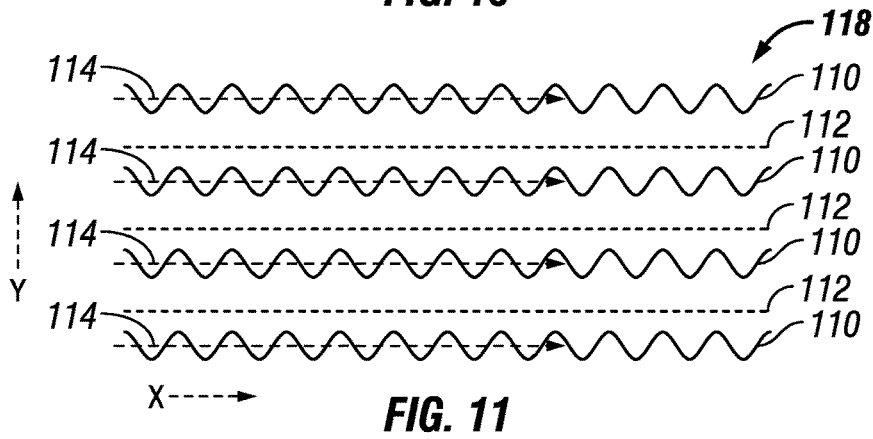

FIGS. 10 and 11 show a further modification to plies compared to those in FIG. 8, wherein second fibers do not include ripples or include ripples that deviate to a lesser extent. FIG. 10 is a top view of a ply 108 where the x direction corresponds to a lateral dimension along the fiber lengths and the y direction corresponds to a lateral dimension across the width of the combined fibers in ply 108. Rippled fibers 100 have a common first composition and rippled second fibers 102 have a common second composition different from the first composition. Fibers 100 are aligned along substantially parallel first routes 104 and fibers 102 are aligned along substantially parallel second routes 106. First routes 104 are parallel with second routes 106. In addition to having a different composition, ripples in fibers 102 deviate to a lesser extent than ripples in fibers 100. Specifically, the period of fibers 102 is twice that of fibers 100. For each cycle in ripples of fibers 102, two cycles exist in ripples of fibers 100. The ripples of fibers 100 are coextensive with a geometric surface defined by first routes 104 within ply 108. The ripples of second fiber 102 are also coextensive with that geometric surface. When ply 108 is planar, it could be said that fibers 100 and 102 deviate in-plane.

FIG. 11 shows a top view of rippled first fibers 110 and second fibers 112, which are not rippled, included in a ply 118. Ripples in first fibers 110 deviate from and return to substantially parallel first routes 114. Second fibers 112 do not deviate from a fiber route, instead being superimposed thereon since no ripples are in fibers 112. Routes for fibers 112 are thus not shown in FIG. 11 as not distinguishable from fibers 112. First route 114 and second fibers 112 are substantially parallel. The x direction corresponds to a lateral dimension along the fiber lengths and the y direction corresponds to a lateral dimension across the width of the combined fibers in ply 118. The ripples of fibers 110 are coextensive with a geometric surface defined by first routes 114 within ply 118.

FIGS. 10 and 11 are useful to explain the concept of "path length." The path lengths for fibers 100, 102, 110, and 112 are measured along the paths that the fibers travel throughout their deviations. While all of the fibers have a "route" designating the direction of fiber travel, the fiber "paths" correspond to the specific position of the fiber itself throughout its deviations from the fiber route. Consequently, it will be appreciated that, between the fiber ends displayed in FIGS. 10 and 11, fibers 100 and 110 have the longest path length, fibers 102 have the next longest path length, and fibers 112 have the shortest path length (with no deviations).

Accordingly, fibers 100/110, 102, and 112 possess differing abilities to absorb kinetic energy during an impact event. Fibers 112 may only absorb an amount of kinetic energy that is sufficient to plastically deform and fail fibers 112. The degree of plastic deformation varies by type of fiber material. Brittle fibers fail after little or no deformation and more ductile fibers fail after plastically elongating. Fibers 102 may absorb an amount of kinetic energy sufficient to pull out the ripples, plastically deform, and fail fibers 102. Fibers 100/110 may absorb a greater amount of kinetic energy, compared to fibers 102 and 112, sufficient to pull out the ripples of fibers 100/110 with the longest path length, and plastically deform and fail such fibers. Each stage of pulling out the ripples, plastically deforming the fiber, and failing the fiber absorbs an amount of kinetic energy. Thus, the path lengths of fiber deviations (as well as fiber failure strain) may be varied to accommodate varying levels of kinetic energy absorption.

Path length may be selected by selecting both the amplitude and the period of ripples. For a given amplitude, increasing the period (distance per cycle) of ripples will decrease the path length. For a given period, decreasing the amplitude (height change) of ripples will decrease the path length. One fiber may deviate from its route to a lesser extent than another fiber deviates from its route because of less amplitude in ripples, greater period in ripples, or both. In other words, less deviation results in shorter path length.

FIGS. 10 and 11 incorporate the design consideration of different composition among fibers as well as the design consideration of ripples with different path lengths. However, it will be appreciated that fibers of the same composition could be used in FIGS. 10 and 11 such that only the design consideration of ripples with different path lengths is addressed.

FIGS. 12-15 correspond with FIGS. 8-11, respectively, except that seven plies are shown with the x directions corresponding to a lateral dimension along the fiber lengths and the z direction corresponding to a vertical dimension through the thickness of the combined plies. FIGS. 12-15 are the side views of a combination of plies with only one fiber in each ply being perceivable in the side views.

FIG. 12 shows a side view of first fiber 120 in a first ply 128 and a second fiber 122 in a second ply 129. Ripples in first fiber 120 deviate from and return to a first route 124 within first ply 128. Ripples in second fiber 122 deviate from and return to a second route 126 within second ply 129. First route 124 and second route 126 are substantially parallel. It will be appreciated that the deviations of ripples in first fiber 120 are out-of-plane when first ply 128 is planar. The ripples in second fiber 122 are also out-of-plane. For the general case, the ripples do not fully coextend with a geometric surface defined by first route 124 combined with additional first routes 124 (not shown) of additional first fibers 120 (not shown) within first ply 128, but not apparent from FIG. 12. The ripples in second fiber 122 are also not fully coextensive. Although FIG. 12 shows only one fiber in each ply, it will be appreciated that plies include additional fibers. First fibers 120 in first ply 128 have a first composition in common and second fibers 122 in second ply 129 have a second composition in common that differs from the first composition.

Figure 13:
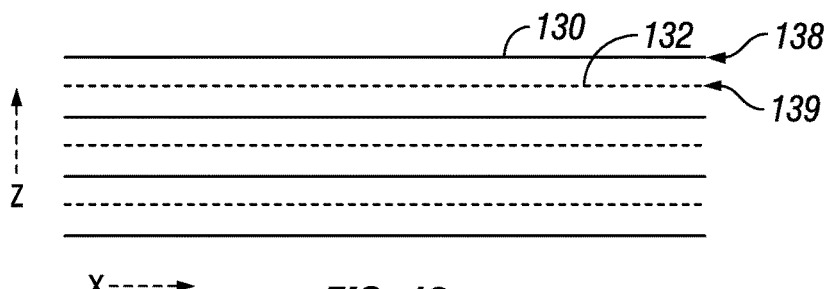

FIG. 13 is similar to FIG. 12 in all respects except for the orientation of fibers 120 and 122. Rotating rippled fibers 120 and 122 about their respective routes to 90° yields rippled fibers 130 and 132 that deviate in-plane with their respective plies 138 and 139 when planar. The ripples of fibers 130 and 132 are not apparent from FIG. 13 since they deviate in-plane. The general case also applies to describe the ripple orientation, but FIG. 13 does not show first or second routes of fibers 130 and 132 since they are superimposed over and could not be distinguished from the fibers themselves. Although FIG. 13 shows only one fiber in each ply, it will be appreciated that plies include additional fibers. Rippled first fibers 130 in first ply 138 have a first composition in common and rippled second fibers 132 in second ply 139 have a second composition in common that differs from the first composition.

Figure 14:
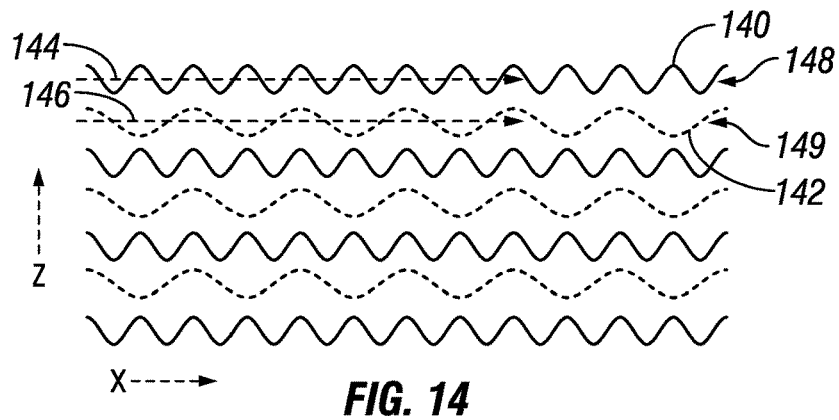
Figure 15:
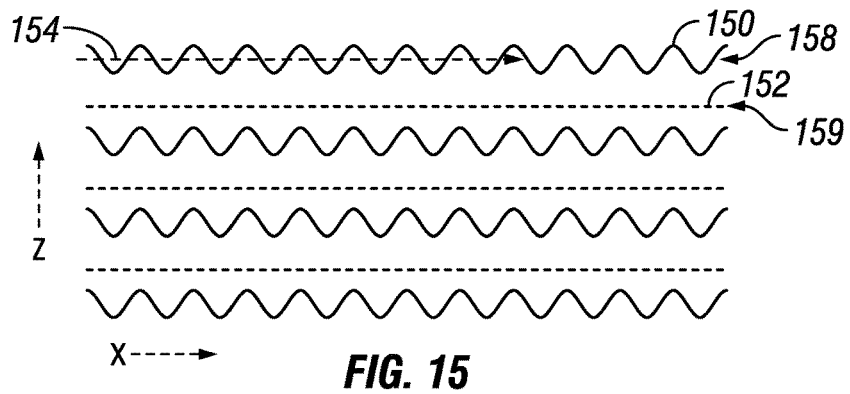

FIGS. 14 and 15 show a further modification to plies compared to those in FIG. 12, wherein second fibers do not include ripples or include ripples that deviate to a lesser extent. FIG. 14 shows a side view of first fiber 140 in a first ply 148 and a second fiber 142 in a second ply 149. Ripples in first fiber 140 deviate from and return to a first route 144 within first ply 148. Ripples in second fiber 142 deviate from and return to a second route 146 within second ply 149. First route 144 and second route 146 are substantially parallel. Ripple orientations are as described analogously for FIG. 12. Although FIG. 14 shows only one fiber in each ply, it will be appreciated that plies include additional fibers. First fibers 140 in first ply 148 have a first composition in common and second fibers 142 in second ply 149 have a second composition in common that differs from the first composition. In addition to having a different composition, ripples in fiber 140 deviate to a lesser extent than ripples in fiber 142. Specifically, the period of fiber 142 is twice that of fiber 140. For each cycle in ripples of fiber 102, two cycles exist in ripples of fiber 100.

FIG. 15 shows a side view of rippled first fiber 150 in a first ply 158 and a second fiber 152 in a second ply 159. Ripples in first fiber 150 deviate from and return to a first route 154 within first ply 158. Second fiber 152 does not deviate from a fiber route, instead being superimposed thereon since no ripples are in fiber 152. A route for fiber 152 is thus not shown in FIG. 15 as not distinguishable from fiber 152. First route 154 and second fiber 152 are substantially parallel. Ripple orientations are as described analogously for FIG. 12. Although FIG. 15 shows only one fiber in each ply, it will be appreciated that plies include additional fibers. First fibers 150 in first ply 158 have a first composition in common and second fibers 152 in second ply 159 have a second composition in common that differs from the first composition.

FIGS. 14 and 15 incorporate the design consideration of different composition among fibers as well as the design consideration of ripples with different path lengths. However, it will be appreciated that fibers of the same composition could be used in FIGS. 14 and 15 such that only the design consideration of ripples with different path lengths is addressed.

Figure 16:
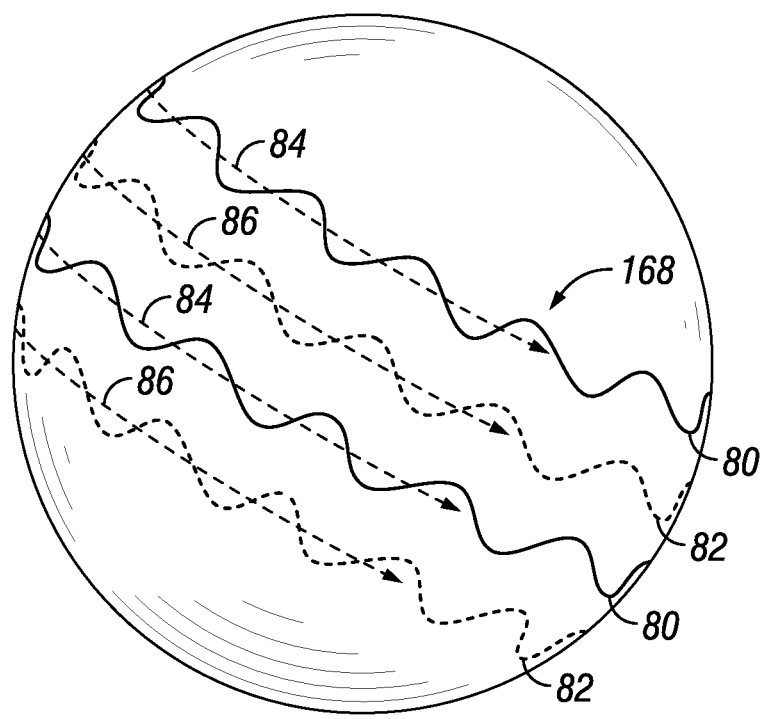
FIG. 16 is a perspective view of a spherical object with rippled fibers aligned along its surface.

FIG. 16 is a perspective view of a spherical object with fibers 80 and 82 of FIG. 8 aligned along lines of latitude on the sphere. FIG. 16 shows that fibers 80 and 82 have different compositions, just as in FIG. 8. Also, FIG. 16 shows that fibers 80 and 82 have the same amplitude and period as in FIG. 8. Routes 84 and 86 within ply 168 forming the surface of the spherical object define a geometric surface, as in FIG. 8. While ply 88 in FIG. 8 is planar, ply 168 in FIG. 16 is curved. Even so, the ripples of fiber 80 are coextensive with a geometric surface defined by first routes 84. The ripples of fibers 86 are also coextensive with the geometric surface. It will be appreciated from the description herein that fibers 90 and 92 in ply 98 of FIG. 9 could also be used in a spherical object like that of FIG. 16. In that case, the ripples of fibers 90 and 92 would not fully coextend with a geometric surface defined by the routes of fibers 90 within ply 98. Instead, the ripples would deviate outward from the geometric surface.

The configurations of FIGS. 3, 6, and 8-15 incorporate varied design considerations including selecting fiber path length, as implemented with the use of ripples, and selecting mechanical properties, as implemented with the use of different fiber compositions (and/or fiber shapes or manufacturing methods). A further design consideration includes the degree of adhesion between the fibers and the matrix, as implemented with the use of different combinations of fiber and matrix compositions. In the examples of FIGS. 3 and 7, if the matrix encapsulating the fibers to form composite material adheres to the fibers too strongly, then the ripples might not pull out without failing. Then, the kinetic energy absorption afforded by pulling out ripples does not occur. Consequently, the degree of adhesion may be selected so that, at a minimum, ripples pull out during an impact event, absorbing kinetic energy before failing.

Largely, matrix composition determines adhesion to a given type of fiber material and other mechanical properties, but matrix manufacturing methods, such as curing processes, may also play a role. Such properties are often well-defined for known matrix materials and the most appropriate known materials to achieve specified design goals may be selected. Conceivably, matrix materials of the same chemical composition could exhibit different mechanical properties. Consequently, any references herein to matrix materials of different composition could be generalized to reference materials of different mechanical properties, such as fiber adhesion, even if matrix composition is the same. Examples of known matrix materials include thermoplastics, including thermoplastic polyurethanes, and thermosets, including polyesters, epoxies, and rubber-like materials (lightly cross-linked, like neoprene), silicones, etc. Others are known as well.

The ductility of the matrix, as determined by composition, also influences how the ripples pull out of the fiber. In a ductile matrix, the matrix may stretch during an impact while the ripples pull out of the fiber before breaking adhesion of fibers with the matrix. It is conceivable that pulling out ripples and plastically deforming the matrix through stretching may be sufficient to absorb some amounts of kinetic energy without breaking adhesion of fibers with the matrix.

The strength of the matrix, as determined by composition, also influences how the ripples pull out of the fiber. Instead of breaking adhesion with the fibers, the matrix may shear during the impact while the ripples pull out of the fiber and a portion of the matrix remains adhered to the fiber. Understandably then, pulling out ripples and plastically deforming the matrix through shearing may be sufficient to absorb some amounts of kinetic energy without breaking adhesion of fibers with the matrix. Even so, some portions of a fiber may break adhesion with the matrix while other portions remain adhered to sheared matrix portions with the ripples nonetheless pulling out.

Since adhesion varies for different combinations of fiber composition and matrix composition, the degree of adhesion may be used as a third design consideration. With more adhesion, so long as the fibers do not fail, more kinetic energy may be absorbed. A wide variety of progressive fiber loading modes thus become available. Loads applied to a composite material during an impact event may be distributed across multiple kinetic energy absorption mechanisms without breaching the composite. Three possible mechanisms include: 1) pulling out fiber ripples during the stretching and/or shearing of the matrix, during the breaking of adhesion with the matrix, or both, 2) breaking adhesion of fibers with the matrix or shearing the matrix before fiber failure, and 3) selecting a subset of fibers with a failure strain sufficiently low to fail before other fibers fail.

A fourth design consideration includes selecting a lateral and/or thickness region of a composite material for implementing the other three design considerations. That is, implementation of the three design considerations may be beneficially heterogeneously applied throughout a composite article, whether within a ply, ply-to-ply, or otherwise across lateral and/or thickness regions. Some portions of fibers may be rippled while other portions are less rippled or not rippled, fibers with different mechanical properties may be used in selected lateral and/or thickness regions, and matrix adhesion, ductility, and strength may vary in selected lateral and/or thickness regions. For example, while one length portion of a fiber is rippled to a designated extent, another length portion of the same fiber may be rippled to a lesser extent. Rippling, mechanical properties, and matrix adhesion, ductility, and strength may be designated in desirable patterns. Rippling, mechanical properties, and matrix adhesion, ductility, and strength may be designated in desirable combinations of all three considerations or fewer than three considerations. Therefore, energy absorption may be controlled as a function of location in the composite article.

In keeping with the third mechanism above, fiber failure allows absorption of additional kinetic energy beyond plastic deformation after pulling out ripples. According to the fourth design consideration above, one implementation of controlling energy absorption as a function of location involves varying failure strain, a mechanical property, ply-to-ply in a thickness region. Fibers firstly impacted by an object might have a lower failure strain such that their failure absorbs additional kinetic energy while fibers secondly impacted avoid failure with a higher failure strain. This implementation may be included in the methods and apparatuses described herein such that the firstly impacted fibers, the secondly impacted fibers, or both include fiber ripples for further kinetic energy absorption.

In a similar implementation, ripples may pull out of firstly impacted fibers with a higher failure strain while fibers secondly impacted fail with a lower failure strain to absorb additional kinetic energy and to avoid failure of the firstly impacted fibers. This implementation may be included in the methods and apparatuses described herein such that the fiber ripples of the firstly impacted fibers absorb additional kinetic energy, but the secondly impacted fibers might or might not include ripples.

In a related implementation, more than two failure strains may be used to provide a gradient of failure strains either increasing or decreasing as an object impacts fibers in successive plies. Other variations of using ripples or not using ripples and using two failure strains or using more than two failure strains are conceivable to achieve the design consideration of controlling energy absorption as a function of location. These implementations may be included in the methods and apparatuses described herein.

Behavior of a composite article may be described in three general categories. First, impact of an object results in no plastic deformation with kinetic energy absorbed through the strength and resilience of the structure. Second, object impact produces plastic deformation, but not breach of the structure. Third, object impact produces both plastic deformation and breach. The methods and apparatuses herein apply to the latter two categories. Significant explanation exists herein regarding avoiding breach by progressive fiber loading. However, even though kinetic energy is progressively loaded according to the methods and apparatuses herein, the possibility exists for breach when the load nonetheless exceeds the strength of the materials.

Figure 17A:
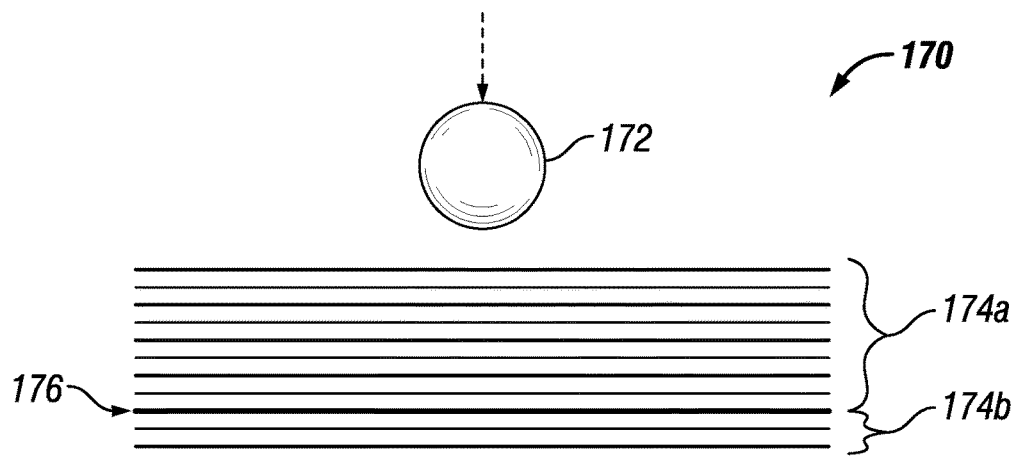
FIGS. 17A, 17B, and 17C are sequential side views of an object impacting a series of layers.
Figure 17B:
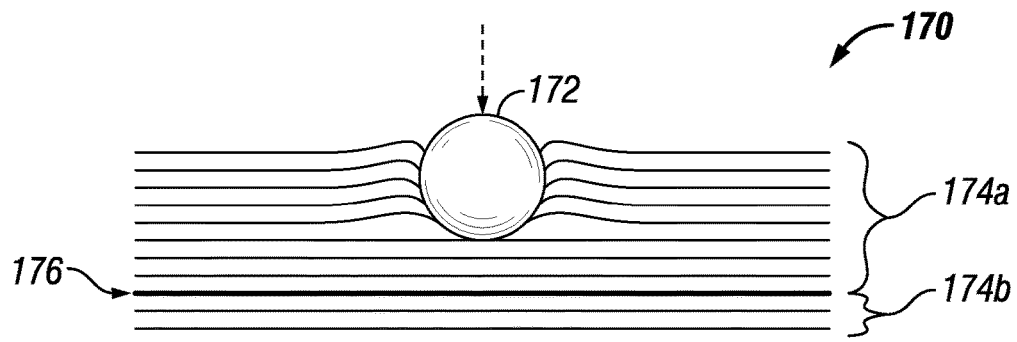
Figure 17C:
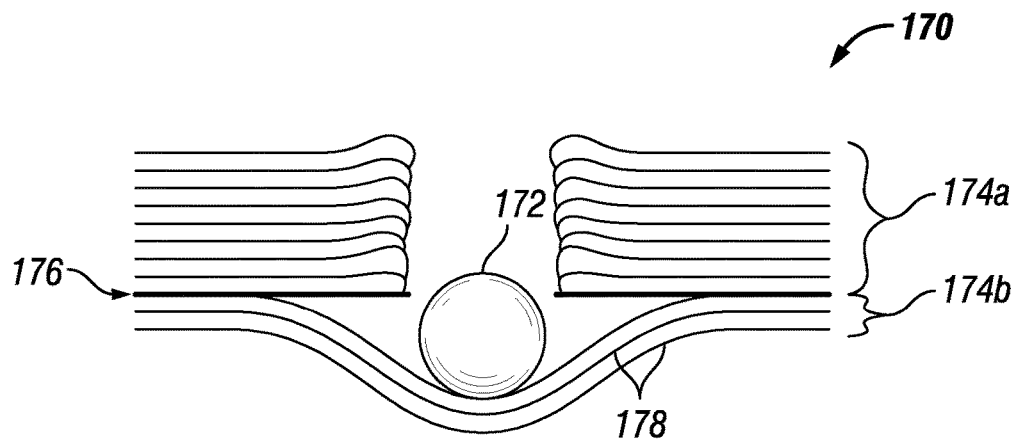

Consequently, FIGS. 17A, 17B, and 17C explain an additional measure that may be used in conjunction with the other methods and apparatuses described herein. In FIG. 17A, a composite 170 includes layers 174a/174b, which may be individual plies or groups of plies, about to be impacted by object 172. Composite 170 includes frontside layers 174a designated apart from backside layers 174b by a design boundary 176. A region of reduced adhesion may exist at design boundary 176, or frontside layers 174a and backside layers 174b may perform differently, or both. FIG. 17B shows object 172 impacting frontside layers 174a and traveling through them. In FIG. 17B, the methods and apparatuses described herein for progressively loading the kinetic energy from object 172 may be utilized. For example, layers 174a, 174b, or both may include rippled fibers.

Rippled fibers may be provided in a first ply as a plurality of inherently straight first fibers. Individual first fibers have a cross-sectional shape that is substantially constant along a first length portion of the individual first fibers. The first length portions are aligned along substantially parallel first routes within the first ply. The first length portions are also arranged with first localized ripples in the first length portions that deviate from and return to individual first routes of respective first length portions. Layers 174a, 174b, or both may include a second ply parallel to the first ply, a plurality of inherently straight second fibers contained in the first ply or the second ply, and a matrix material at least partially encapsulating the first and second plies. Individual second fibers have a cross-sectional shape that is substantially constant along a second length portion of the individual second fibers. The second length portions are aligned along substantially parallel second routes within the respective first ply or second ply. The second length portions are arranged without localized ripples in the second length portions or with second localized ripples in the second length portions that deviate from individual second routes of respective second length portions to a lesser extent than the first localized ripples and return to the individual second routes. The second routes are substantially parallel to the first routes.

Rippled fibers may instead be provided in a first ply as a plurality of inherently straight first fibers. Individual first fibers have a cross-sectional shape that is substantially constant along a first length portion of the individual first fibers. The first length portions of the first fibers are aligned along substantially parallel first routes within the first ply. The first length portions are also arranged with a first pattern referenced to individual first routes of respective first length portions. Layers 174a, 174b, or both may include a second ply parallel to the first ply, a plurality of inherently straight second fibers contained in the first ply or the second ply, and a matrix material at least partially encapsulating the first and second plies. Individual second fibers have a cross-sectional shape that is substantially constant along a second length portion of the individual second fibers. The second length portions are aligned along substantially parallel second routes within the respective first ply or second ply. The second length portions are arranged with a second pattern referenced to individual second routes of respective second length portions in a manner different from the first pattern. The second routes are substantially parallel to the first routes. Layers 174a, 174b, or both may include a means for progressively loading the first and second fibers when receiving a sufficient force from kinetic energy.

A kinetic energy absorption method may be implemented in layers 174a, 174b, or both. The method provides a first ply, a plurality of inherently straight first fibers contained in the first ply, a second ply parallel to the first ply, a plurality of inherently straight second fibers contained in the first ply or the second ply, and a matrix material at least partially encapsulating the first and second plies. Individual first fibers have a first length portion providing a plurality of first length portions aligned along substantially parallel first routes within the first ply. The plurality of first length portions are arranged with first localized ripples in the first length portions that deviate from and return to individual first routes of respective first length portions. Individual second fibers have a second length portion providing a plurality of second length portions aligned along substantially parallel second routes within the respective first ply or second ply. The plurality of second length portions are arranged without localized ripples in the second length portions or with second localized ripples in the second length portions that deviate from individual second routes of respective second length portions to a lesser extent than the first localized ripples and return to the individual second routes. The second routes are substantially parallel to the first routes.

The method includes progressively loading the first fibers and the second fibers when the first and second plies receive a sufficient force from kinetic energy by:

irreversibly shearing the matrix material or breaking adhesion of the matrix material to at least a part of individual second fibers accompanied by plastically deforming or causing failure of the second fibers; and irreversibly shearing the matrix material or breaking adhesion of the matrix material to at least part of the first localized ripples accompanied by pulling out at least part of the first localized ripples without failure of the first fibers.

In the event that progressive loading from one of the methods or apparatuses herein is insufficient to stop object 172, FIG. 17C shows backside layers 174b becoming catching layers 178 as they delaminate and release from contact with frontside layers 174a. By controlling the release properties at design boundary 176 with a region of reduced adhesion, backside layers 174b may be released, enabling various energy absorption mechanisms. For example, shearing the region of reduced adhesion absorbs kinetic energy. Also, the shear performance between backside layers 174b as it becomes catching layers 178 can be controlled to allow shearing between such layers. The shearing between catching layers 178 promotes free movement of catching layers 178 and additionally absorbs kinetic energy. As a result, breach of the structure may be avoided by relying on a mechanism in addition to progressive loading and other methods and apparatuses herein.

Alternatively, or in addition, a progressive loading concept from the methods and apparatuses herein may be incorporated into backside layers 174b to produce catching layers 178. As one example, frontside layers 174a firstly impacted by an object might have a lower failure strain such that their failure absorbs additional kinetic energy while backside layers 174b secondly impacted avoid failure with a higher failure strain. Object impact may thus release backside layers 174b, becoming catching layers 178. The firstly impacted fibers, the secondly impacted fibers, or both may include fiber ripples for further kinetic energy absorption.

According to one embodiment, a kinetic energy absorptive composite article includes a first ply and a plurality of inherently straight first fibers contained in the first ply. Inherently straight fibers may be contrasted with fibers set in a curved form that resists straightening. Inherently straight fibers have no set form when in a relaxed state and do not resist straightening. In the present article, individual first fibers have a cross-sectional shape that is substantially constant along a first length portion of the individual first fibers. A substantially constant cross-sectional shape might vary in a de minimis amount along fiber length only to the extent that it remains within accepted manufacturing tolerance of a diameter specification. The first length portions are aligned along substantially parallel first routes within the first ply. The first length portions are also arranged with first localized ripples in the first length portions that deviate from and return to individual first routes of respective first length portions.

The present article includes a second ply parallel to the first ply, a plurality of inherently straight second fibers contained in the first ply or the second ply, and a matrix material at least partially encapsulating the first and second plies. Individual second fibers have a cross-sectional shape that is substantially constant along a second length portion of the individual second fibers. The second length portions are aligned along substantially parallel second routes within the respective first ply or second ply. The second length portions are arranged without localized ripples in the second length portions or with second localized ripples in the second length portions that deviate from individual second routes of respective second length portions to a lesser extent than the first localized ripples and return to the individual second routes. The second routes are substantially parallel to the first routes.

Additional features may be implemented in the present article. By way of example, the composite article may be an aircraft fuel bladder. The matrix material may be continuous, that is, the same material encapsulating both the first and second plies. The individual first and second fibers may have a substantially round cross-sectional shape. Substantially round shapes include circular, oval, ovoid, and elliptical shapes.

The cross-sectional shape of individual first fibers may be substantially constant along another length portion of the individual first fibers. The other length portions of the first fibers may be aligned along substantially parallel other routes within the first ply. The other length portions may be arranged without localized ripples in the other length portions such that the other length portions are coextensive with their respective other route. That is, individual first fibers may have a rippled portion and a straight portion. Having selected length portions of fibers rippled and selected length portions not rippled accommodates designating regions of the composite article for absorbing more kinetic energy than other regions in keeping with description above.

The first localized ripples may be substantially periodic and have a period in common and an amplitude in common among the first fibers. The second fibers may be arranged with second localized ripples that are substantially periodic and have a period in common and an amplitude in common among the second fibers. The period of the second localized ripples may be different from the period of the first localized ripples.

The first fibers may have a material composition in common and the second fibers may have a material composition in common that is different from the first fibers' material composition. The first fibers may exhibit a failure strain in common and the second fibers may exhibit a failure strain in common that is different from the first fibers' failure strain.

The first localized ripples deviating from and returning to the first routes may be coextensive with a first geometric surface defined by the first routes within the first ply. The second fibers may be arranged with second localized ripples and the second localized ripples deviating from and returning to the second routes may be coextensive with the first geometric surface or may be coextensive with a second geometric surface defined by the second routes within the second ply.

In the alternative, the first localized ripples deviating from and returning to the first routes might not fully coextend with a first geometric surface defined by the first routes within the first ply. The second fibers may be arranged with second localized ripples and the second localized ripples deviating from and returning to the second routes might not fully coextend with the first geometric surface and might not fully coextend with a second geometric surface defined by the second routes within the second ply.

The second fibers may be contained in the first ply. In the alternative, the second fibers may be contained in the second ply and not in the first ply.

The composite article may further include a backside ply containing a plurality of inherently straight third fibers arranged without localized ripples. The matrix material may at least partially encapsulate the backside ply. The backside ply may consist of inherently straight third fibers arranged without localized ripples. The third fibers may have a constant failure strain along their lengths. The backside ply may consist of third fibers having a constant failure strain.

The additional features that may be implemented in the present article may also be implemented in other embodiments herein.

In another embodiment, a kinetic energy absorptive composite article includes a first ply and a plurality of inherently straight first fibers contained in the first ply. Individual first fibers have a cross-sectional shape that is substantially constant along a first length portion of the individual first fibers. The first length portions of the first fibers are aligned along substantially parallel first routes within the first ply. The first length portions are also arranged with a first pattern referenced to individual first routes of respective first length portions.

The present article includes a second ply parallel to the first ply, a plurality of inherently straight second fibers contained in the first ply or the second ply, and a matrix material at least partially encapsulating the first and second plies. Individual second fibers have a cross-sectional shape that is substantially constant along a second length portion of the individual second fibers. The second length portions are aligned along substantially parallel second routes within the respective first ply or second ply. The second length portions are arranged with a second pattern referenced to individual second routes of respective second length portions in a manner different from the first pattern. The second routes are substantially parallel to the first routes.

The article further includes a means for progressively loading the first and second fibers when the composite article receives a sufficient force from kinetic energy. The sufficient force is high enough to overcome a threshold below which no plastic deformation of the article occurs. Aircraft, spacecraft and other vehicular structures endure a wide variety of forces with no plastic deformation. The methods and apparatuses herein do not necessarily change the ability to endure such forces, instead changing the nature of deformation beyond the threshold to absorption of higher levels of kinetic energy rather than breach of the structure.

Additional features may be implemented in the present article. By way of example, the composite article is an aircraft fuel bladder. The progressive loading means may include:

the first pattern having first localized ripples in the first length portions that deviate from and return to individual first routes of respective first length portions; and the second pattern having no localized ripples in the second length portions or having second localized ripples in the second length portions that deviate from individual second routes of respective second length portions to a lesser extent than the first localized ripples and return to the individual second routes.

The second fibers may be arranged without localized ripples and the progressive loading means may further include:

a period and an amplitude of the first localized ripples;
a failure strain of the first fibers;
a failure strain of the second fibers; and
a degree of adhesion between the matrix material and the first and second fibers. The progressive loading means irreversibly breaks adhesion of the matrix material to at least a part of individual second fibers accompanied by plastically deforming or causing failure of the second fibers. The progressive loading means irreversibly breaks adhesion of the matrix material to at least part of the first localized ripples accompanied by pulling out at least part of the first localized ripples without failure of the first fibers when the first and second plies receive the force from kinetic energy.

The second fibers may be arranged with the second localized ripples and the progressive loading means may further include:

a period and an amplitude of the first localized ripples;
a period and an amplitude of the second localized ripples;
a failure strain of the first fibers;
a failure strain of the second fibers; and
a degree of adhesion between the matrix material and the first and second fibers. The progressive loading means irreversibly breaks adhesion of the matrix material to at least a part of individual second fibers accompanied by pulling out at least part of the second localized ripples followed by plastically deforming or causing failure of the second fibers. The progressive loading means irreversibly breaks adhesion of the matrix material to at least part of the first localized ripples accompanied by pulling out at least part of the first localized ripples without failure of the first fibers when the first and second plies receive the force from kinetic energy.

The additional features that may be implemented in the present article may also be implemented in other embodiments herein.

In a further embodiment, a kinetic energy absorption method provides a composite article including a first ply, a plurality of inherently straight first fibers contained in the first ply, a second ply parallel to the first ply, a plurality of inherently straight second fibers contained in the first ply or the second ply, and a matrix material at least partially encapsulating the first and second plies. Individual first fibers have a first length portion providing a plurality of first length portions are aligned along substantially parallel first routes within the first ply. The plurality of first length portions are arranged with first localized ripples in the first length portions that deviate from and return to individual first routes of respective first length portions.

Individual second fibers have a second length portion and the plurality of second length portions are aligned along substantially parallel second routes within the respective first ply or second ply. The plurality of second length portions are arranged without localized ripples in the second length portions or with second localized ripples in the second length portions that deviate from individual second routes of respective second length portions to a lesser extent than the first localized ripples and return to the individual second routes. The second routes are substantially parallel to the first routes.

The method includes progressively loading the first fibers and the second fibers when the first and second plies receive a sufficient force from kinetic energy by:

irreversibly shearing the matrix material or breaking adhesion of the matrix material to at least a part of individual second fibers accompanied by plastically deforming or causing failure of the second fibers; and irreversibly shearing the matrix material or breaking adhesion of the matrix material to at least part of the first localized ripples accompanied by pulling out at least part of the first localized ripples without failure of the first fibers.

Additional features may be implemented in the present method. By way of example, the second fibers may be arranged with the second localized ripples and the method may further include pulling out at least part of the second localized ripples followed by plastically deforming or causing failure of the second fibers when the first and second plies receive the force from kinetic energy. Individual first fibers may have a cross-sectional shape that is substantially constant along the first length portion and individual second fibers may have a cross-sectional shape that is substantially constant along the second length portion.

The composite article may further include a backside ply containing a plurality of inherently straight third fibers arranged without localized ripples and the matrix material at least partially encapsulating the backside ply. The progressive loading may further include applying the force with an object having kinetic energy and catching the object with the backside layer after it passes through the first and second plies. The third fibers may have a constant failure strain along their lengths.

The additional features that may be implemented in the present method may also be implemented in other embodiments herein.

The inventors expressly contemplate that the various options described herein for individual methods and apparatuses are not intended to be so limited except where incompatible. The features and benefits of individual methods herein may also be used in combination with apparatuses and other methods described herein even though not specifically indicated elsewhere. Similarly, the features and benefits of individual apparatuses herein may also be used in combination with methods and other apparatuses described herein even though not specifically indicated elsewhere.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A kinetic energy absorptive composite article comprising:
   a first ply;
   a plurality of inherently straight first fibers contained in the first ply, individual first fibers having a cross-sectional shape that is substantially constant along first length portions of each of the individual first fibers, the first length portions being aligned along substantially parallel first routes within the first ply and arranged with first localized ripples in the first length portions that deviate from and return to individual first routes of respective first length portions, wherein the first localized ripples are substantially periodic and have a period in common with each other and an amplitude in common with each other;
   a second ply parallel to the first ply;
   a plurality of inherently straight second fibers contained in the first ply or the second ply, individual second fibers having a cross-sectional shape that is substantially constant along a second length portion of the individual second fibers, the second length portions being aligned along substantially parallel second routes within the respective first ply or second ply and arranged without localized ripples in the second length portions or with second localized ripples in the second length portions that deviate from individual second routes of respective second length portions to a lesser extent than the first localized ripples and return to the individual second routes, the second routes being substantially parallel to the first routes; and
   a matrix material at least partially encapsulating the first and second plies.

2. The article of claim 1 wherein the individual first and second fibers have a substantially round cross-sectional shape.

3. The article of claim 1 wherein the cross-sectional shape of individual first fibers is substantially constant along other length portions of the individual first fibers, the other length portions of the first fibers being aligned along substantially parallel other routes within the first ply and arranged without localized ripples in the other length portions such that the other length portions are coextensive with their respective other route.

4. The article of claim 1 wherein second fibers are arranged with second localized ripples that are substantially periodic and have a period in common with each other and an amplitude in common with each other, the period of the second localized ripples being different from the period of the first localized ripples.

5. The article of claim 1 wherein the first fibers have a same material composition and the second fibers have a same material composition that is different from the first fibers' material composition.

6. The article of claim 1 wherein the first fibers exhibit a same failure strain and the second fibers exhibit a same failure strain that is different from the first fibers' failure strain.

7. The article of claim 1 wherein the first localized ripples deviating from and returning to the first routes are coextensive with a first geometric surface defined by the first routes within the first ply.

8. The article of claim 7 wherein the second fibers are arranged with second localized ripples and the second localized ripples deviating from and returning to the second routes are coextensive with the first geometric surface or are coextensive with a second geometric surface defined by the second routes within the second ply.

9. The article of claim 1 wherein the first localized ripples deviating from and returning to the first routes do not fully coextend with a first geometric surface defined by the first routes within the first ply.

10. The article of claim 1 wherein the second fibers are contained in the first ply.

11. The article of claim 1 wherein the second fibers are contained in the second ply and not in the first ply.

12. The article of claim 1 further comprising a backside ply containing:
    a plurality of inherently straight third fibers arranged without localized ripples; and
    the matrix material at least partially encapsulating the backside ply.

13. A kinetic energy absorptive composite article comprising:
    a first ply;
    a plurality of inherently straight first fibers contained in the first ply, individual first fibers having a cross-sectional shape that is substantially constant along a first length portion of the individual first fibers, the first length portions of the first fibers being aligned along substantially parallel first routes within the first ply and arranged with a first pattern referenced to individual first routes of respective first length portions;
    a second ply parallel to the first ply;
    a plurality of inherently straight second fibers contained in the first ply or the second ply, individual second fibers having a cross-sectional shape that is substantially constant along a second length portion of the individual second fibers, the second length portions being aligned along substantially parallel second routes within the respective first ply or second ply and arranged with a second pattern referenced to individual second routes of respective second length portions in a manner different from the first pattern, the second routes being substantially parallel to the first routes;

a matrix material at least partially encapsulating the first and second plies; and a means for progressively loading the first and second fibers when the composite article receives an impact force, wherein the means for progressive loading comprises:

the first pattern having first localized ripples in the first length portions that deviate from and return to individual first routes of respective first length portions, wherein the first localized ripples are substantially periodic and have a period in common with each other and an amplitude in common with each other.

14. The article of claim 13 wherein the means for progressive loading comprises:

the second pattern having no localized ripples in the second length portions or having second localized ripples in the second length portions that deviate from individual second routes of respective second length portions to a lesser extent than the first localized ripples and return to the individual second routes.

15. The article of claim 14 wherein the second fibers are arranged without localized ripples and the means for progressive loading further comprises:

a failure strain of the first fibers;

a failure strain of the second fibers; and a degree of adhesion between the matrix material and the first and second fibers, the means for progressive loading irreversibly breaking adhesion of the matrix material to at least a part of individual second fibers accompanied by plastically deforming or causing failure of the second fibers, and irreversibly breaking adhesion of the matrix material to at least part of the first localized ripples accompanied by pulling out at least part of the first localized ripples without failure of the first fibers when the first and second plies receive the force from kinetic energy.

16. The article of claim 14 wherein the second fibers are arranged with the second localized ripples and the means for progressive loading further comprises:

a period and an amplitude of the second localized ripples;

a failure strain of the first fibers;

a failure strain of the second fibers; and a degree of adhesion between the matrix material and the first and second fibers, the means for progressive loading irreversibly breaking adhesion of the matrix material to at least a part of individual second fibers accompanied by pulling out at least part of the second localized ripples followed by plastically deforming or causing failure of the second fibers, and irreversibly breaking adhesion of the matrix material to at least part of the first localized ripples accompanied by pulling out at least part of the first localized ripples without failure of the first fibers when the first and second plies receive the force from kinetic energy.

17. A kinetic energy absorptive composite article comprising:

a plurality of first fibers aligned along substantially parallel first routes within a first ply and arranged with first ripples that deviate from and return to individual first routes of respective first fibers, wherein the first ripples are substantially periodic and have a period in common with each other and an amplitude in common with each other;

a plurality of second fibers contained in the first ply or in a second ply and arranged without ripples or with second ripples that deviate from individual second routes of respective second fibers to a lesser extent than the first ripples and return to the individual second routes, the second routes being substantially parallel to the first routes; and a matrix material at least partially encapsulating the first fibers and second fibers.

18. The article of claim 17, wherein second fibers are arranged with second ripples that are substantially periodic and have a period in common with each other and an amplitude in common with each other, the period of the second ripples being different from the period of the first ripples.

19. The article of claim 17 wherein the first fibers have a same material composition and the second fibers have a same material composition that is different from the first fibers' material composition.

20. The article of claim 17 wherein the first fibers exhibit a same failure strain and the second fibers exhibit a same failure strain that is different from the first fibers' failure strain.

* * * * *